(12) United States Patent
Katayama et al.

(10) Patent No.: US 8,879,683 B2
(45) Date of Patent: Nov. 4, 2014

(54) JET PUMP BEAM AND METHOD FOR PRODUCING THE SAME

(75) Inventors: Yoshinori Katayama, Yokohama (JP); Motoji Tsubota, Fujisawa (JP); Yuuji Saito, Yokohama (JP); Hajime Mori, Yokohama (JP); Norihiko Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 648 days.

(21) Appl. No.: 13/139,835

(22) PCT Filed: Dec. 1, 2009

(86) PCT No.: PCT/JP2009/070147
§ 371 (c)(1),
(2), (4) Date: Jun. 15, 2011

(87) PCT Pub. No.: WO2010/071017
PCT Pub. Date: Jun. 24, 2010

(65) Prior Publication Data
US 2011/0255649 A1    Oct. 20, 2011

(30) Foreign Application Priority Data

Dec. 15, 2008 (JP) ................................. 2008-318820

(51) Int. Cl.
*G21C 19/00* (2006.01)
*C22C 19/05* (2006.01)
*C22F 1/10* (2006.01)
*G21C 15/25* (2006.01)

(52) U.S. Cl.
CPC .............. *G21C 15/25* (2013.01); *C22C 19/056* (2013.01); *C22C 19/055* (2013.01); *Y02E 30/40* (2013.01); *C22F 1/10* (2013.01)
USPC ........................................................ 376/372

(58) Field of Classification Search
USPC ........................................................ 376/372
See application file for complete search history.

(56) References Cited

U.S. PATENT DOCUMENTS 4,979,995 A * 12/1990 Hattori et al. ................. 148/675
2003/0051777 A1* 3/2003 Sudo ............................. 148/427
(Continued)

FOREIGN PATENT DOCUMENTS

JP    59 85834        5/1984
JP    61-79743 A      4/1986
(Continued)

OTHER PUBLICATIONS

Extended European Search Report issued Apr. 16, 2013, in European Patent Application No. 09833321.4.
(Continued)

*Primary Examiner* — Timothy A Brainard
(74) *Attorney, Agent, or Firm* — Oblon, Spivak, McClelland, Maier & Neustadt, L.L.P.

(57) ABSTRACT

A jet pump beam is made of improved heat-treated precipitation-hardened nickel base alloy excellent in anti-stress corrosion cracking properties and high-temperature strength, and having high ductility and a high elastic modulus. A jet pump beam 27 made of improved heat-treated nickel base alloy is produced by preparing a precipitation-strengthened nickel base alloy material having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Mn: 0.35% or less, Si: 0.35% or less, S: 0.015% or less, P: 0.03% or less, Cu: 0.30% or less, B: 0.006% or less, and Co: 1.0% or less, and Fe and inevitable impurities constituting a remaining part, subjecting the nickel base alloy material to solution heat treatment at a temperature of 1010° C. to 1090° C., and subjecting the nickel base alloy material to age-hardening heat treatment at a temperature of 694° C. to 714° C. for 5 to 7 hours after the solution heat treatment.

5 Claims, 6 Drawing Sheets

(56) References Cited

U.S. PATENT DOCUMENTS

| | | | |
|---|---|---|---|
| 2006/0140330 A1* | 6/2006 | Francisco | 376/372 |
| 2010/0116383 A1* | 5/2010 | Cloue et al. | 148/675 |
| 2011/0206553 A1* | 8/2011 | Cao et al. | 420/448 |

FOREIGN PATENT DOCUMENTS

| | | | |
|---|---|---|---|
| JP | 62 77448 | | 4/1987 |
| JP | 63-96214 A | | 4/1988 |
| JP | 63096214 A | * | 4/1988 |
| JP | 10 298682 | | 11/1998 |
| WO | WO 2008081118 A2 | * | 7/2008 |

OTHER PUBLICATIONS

International Search Report Issued Feb. 23, 2010 in PCT/JP09/070147 filed Dec. 1, 2009.

English translation of an International Preliminary Report on Patentability and Written Opinion of the International Searching Authority issued Jul. 5, 2011, in Patent Application No. PCT/JP2009/070147.

* cited by examiner

| COMPONENT COMPOSITION (wt. %) | Ni | Cr | Nb+Ta | Mo | Ti | Al | C | Mn |
|---|---|---|---|---|---|---|---|---|
| INCONEL 718 ALLOY | 50.0-55.0 | 17.0-21.0 | 4.75-5.50 | 2.80-3.30 | 0.65-1.15 | 0.20-0.80 | ≦0.08 | ≦0.35 |
| EXAMPLE 1 | 52.23 | 18.67 | 5.01 | 3.06 | 0.93 | 0.55 | 0.024 | 0.04 |
| EXAMPLE 2 | 52.80 | 18.51 | 5.11 | 3.10 | 0.86 | 0.65 | 0.023 | 0.07 |
| EXAMPLE 3 | 51.90 | 18.52 | 5.15 | 3.09 | 0.88 | 0.68 | 0.023 | 0.05 |
| EXAMPLE 4 | 52.16 | 18.67 | 5.10 | 3.13 | 0.86 | 0.66 | 0.023 | 0.05 |

| COMPONENT COMPOSITION (wt. %) | Si | S | P | Cu | B | Co | Fe |
|---|---|---|---|---|---|---|---|
| INCONEL 718 ALLOY | ≦0.35 | ≦0.015 | ≦0.015 | ≦0.30 | ≦0.006 | ≦1.0 | BALANCE |
| EXAMPLE 1 | 0.06 | <0.001 | 0.003 | 0.01 | 0.0042 | 0.02 | BALANCE |
| EXAMPLE 2 | 0.11 | <0.001 | 0.002 | 0.02 | 0.0040 | 0.26 | BALANCE |
| EXAMPLE 3 | 0.08 | <0.001 | 0.002 | 0.01 | 0.0040 | 0.02 | BALANCE |
| EXAMPLE 4 | 0.07 | <0.001 | 0.002 | 0.02 | 0.0036 | 0.03 | BALANCE |

FIG. 6

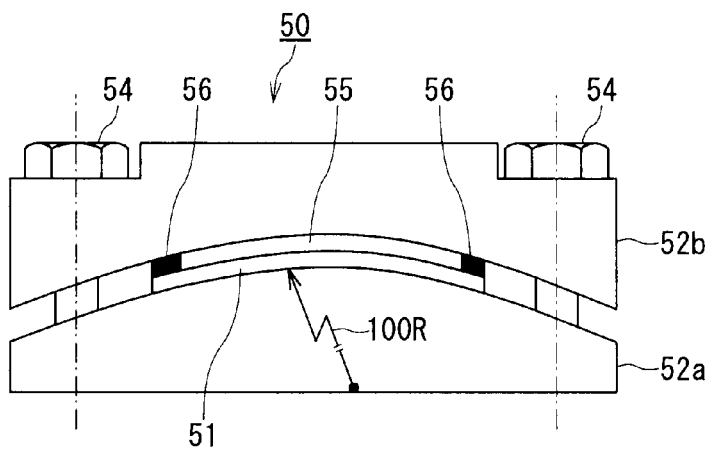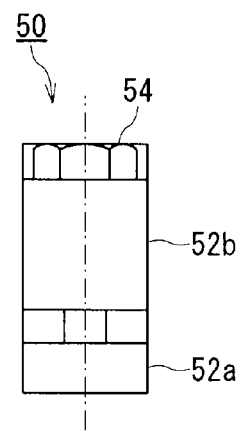
FIG. 7A             FIG. 7B
| TEST PIECE | NO. OF CRACKED PIECE / NO. OF TESTED PIECES | MAXIMUM CRACK DEPTH |
|---|---|---|
| EXAMPLE 1 | 0/5 | 0 |
| EXAMPLE 2 | 0/5 | 0 |
| EXAMPLE 3 | 0/5 | 0 |
| EXAMPLE 4 | 0/5 | 0 |
FIG. 8

JET PUMP BEAM AND METHOD FOR PRODUCING THE SAME

TECHNICAL FIELD

The present invention relates to a jet pump beam used in a jet pump for forcibly circulating high-temperature and high-pressure water (coolant) in a boiling water reactor (BWR), and a method for producing the jet pump beam. More particularly, the present invention relates to a jet pump beam made of an improved heat-treated precipitation-hardened nickel base alloy excellent in anti-stress corrosion cracking properties and having a high elastic modulus and high-temperature strength, and a method for producing the jet pump beam.

BACKGROUND ART

In general, some boiling water reactors comprise an external recirculation system for forcibly feeding a coolant into a reactor core. A jet pump connected to the external recirculation system is provided in a reactor pressure vessel (RPV). A plurality of sets of jet pumps are provided in an annular downcomer portion between the reactor pressure vessel and a core shroud.

Each of the jet pumps is provided in the downcomer portion in the reactor pressure vessel, and comprises a riser pipe, a transition piece, an inlet mixer, and a diffuser. The transition piece is formed integrally on the riser pipe, to constitute a bifurcated portion on a head portion of the riser pipe. The coolant is divided into two streams in the transition piece, and respectively guided to an elbow of the inlet mixer that forms a turn-around flow path. The elbow is press-supported by a jet pump beam made of a spring member, and thereby prevented from moving upward.

In the boiling water reactor, inconel X-750 alloy that is precipitation-hardened Ni base alloy having a high elastic modulus and high-temperature strength has been conventionally used for the pump beam of the jet pump as disclosed in Japanese Patent Laid-Open No. 59-85834 (Patent Document 1). An example in which the inconel X-750 alloy is used for a reactor member is also disclosed in Patent Document 2 (Japanese Patent Laid-Open No. 05-164886).

It is also disclosed in Japanese Patent Laid-Open Nos. 2004-91816 and 04-297537 (Patent Documents 3 and 4) that inconel 718 alloy that is normal heat-treated precipitation-hardened nickel base alloy is also used for a reactor member as a high-strength material having corrosion resistance and high-temperature resistance.

The inconel X-750 alloy as the precipitation-hardened nickel base alloy having a high elastic modulus and high-temperature strength is used for the jet pump beam of the jet pump disclosed in Patent Document 1, which is used under a high-temperature and high-pressure water environment in the boiling water reactor. Although the inconel X-750 alloy has a high elastic modulus and high-temperature strength as the material for constituting the jet pump beam, the inconel X-750 alloy has a problem that stress corrosion cracking (SCC) sensitivity is high under a high-temperature and high-pressure water environment, and stress corrosion cracking occurs under a high-temperature and high-pressure environment during operation of the nuclear reactor.

The inconel 718 alloy disclosed in Patent Document 3 as the nickel base alloy is used for the reactor member in a similar manner to the inconel X-750 alloy. It is disclosed that heat treatment on the inconel 718 alloy is performed by subjecting the material to solution heat treatment at 995° C. to 1040° C., keeping the material at 760° C. for 5 hours, cooling (furnace cooling) the material from 760° C. to 650° C. inside a furnace, keeping the material at 650° C. for 1 hour, and subjecting the material to age-hardening treatment for cooling.

ASTM (American Society for Testing and Materials) B637 also describes an example in which normal heat-treated inconel 718 alloy is subjected to solution heat treatment at 924° C. to 1010° C., kept at 718° C. for 8 hours, cooled inside a furnace, further kept at 620° C. for 8 hours, and then subjected to age-hardening treatment for air-cooling.

Although the normal heat-treated inconel 718 alloy subjected to the normal heat treatment is a material excellent in high-temperature strength as disclosed in ASTM or the like, the normal heat-treated inconel 718 alloy also has a problem that ductility is poor.

DISCLOSURE OF THE INVENTION

To solve the aforementioned problems, it is an object of the present invention to provide a jet pump beam made of improved heat-treated precipitation-hardened nickel base alloy excellent in anti-stress corrosion cracking properties and high-temperature strength and having high ductility and a high elastic modulus, and a method for producing the jet pump beam.

It is another object of the present invention to provide a jet pump beam made of improved heat-treated inconel 718 alloy having mechanical characteristics equivalent to those of inconel X-750 alloy by improving solution heat treatment and age-hardening heat treatment on inconel 718 alloy and ensuring ductility by reducing stress corrosion cracking sensitivity in high-temperature and high-pressure water, and a method for producing the jet pump beam.

To achieve the above object, a jet pump beam according to the present invention is a jet pump beam made of improved heat-treated nickel base alloy, produced by preparing a precipitation-strengthened nickel base alloy material having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Mn: 0.35% or less, Si: 0.35% or less, S: 0.015% or less, P: 0.03% or less, Cu: 0.30% or less, B: 0.006% or less, and Co: 1.0% or less, and Fe and inevitable impurities constituting a remaining part (balance), subjecting the nickel base alloy material to solution heat treatment at 1010° C. to 1090° C., and subjecting the nickel base alloy material to age-hardening heat treatment at 694° C. to 714° C. for 5 to 7 hours after the solution heat treatment.

To achieve the above object, a method for producing a jet pump beam according to the present invention is a method for producing a jet pump beam made of improved heat-treated nickel base alloy, comprising the steps of: preparing a precipitation-strengthened nickel base alloy material having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Mn: 0.35% or less, Si: 0.35% or less, S: 0.015% or less, P: 0.03% or less, Cu: 0.30% or less, B: 0.006% or less, and Co: 1.0% or less, and Fe and inevitable impurities constituting a remaining part (balance); forming the nickel base alloy material into a product shape by machining or cold working after subjecting the nickel base alloy material to solution heat treatment at 1010° C. to 1090° C.; and subjecting the nickel base alloy material formed into the product shape to age-hardening heat treatment at 694° C. to 714° C.

for 5 to 7 hours, thereby to form the jet pump beam made of an improved heat-treated nickel base alloy.

The jet pump beam made of improved heat-treated nickel base alloy may be also produced by roughly forming the nickel base alloy material into the product shape by die forging after melting the nickel base alloy material, subjecting the roughly formed nickel base alloy material to the solution heat treatment at 1010° C. to 1090° C., finishing the nickel base alloy material by the machining or the cold working, and subjecting the finished nickel base alloy material to the age-hardening heat treatment at 694° C. to 714° C. for 5 to 7 hours.

According to a preferred embodiment of the present invention, it is preferable to use the nickel base alloy material containing B of 0.001% or less by mass %.

It is preferable to use the nickel base alloy material having a component composition containing Co of 0.05% or less by mass %.

The nickel base alloy material may be produced from an improved heat-treated nickel base alloy material obtained by forming the nickel base alloy material into a product shape by machining or product processing after the solution heat treatment, and subsequently subjecting the material to the age-hardening heat treatment.

The nickel base alloy material may have a component composition containing B of 0.001% or less, and Co of 0.05% or less by mass %.

It is preferable that the nickel base alloy material formed into the product shape may be subjected to the age-hardening treatment at 604° C. and temperatures close thereto for almost 6 hours.

More specifically, a jet pump beam according to the present invention is a jet pump beam used in a jet pump for forcibly circulating high-temperature and high-pressure water within a reactor pressure vessel of a boiling water reactor, the jet pump beam comprising:

a body made of an elastic material;

a vertical threaded hole provided in a center portion of the body, into which a head bolt is screwed; and a body top portion support surface for supporting a head bolt fixing device, wherein the body is made of precipitation-strengthened nickel base alloy having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Mn: 0.35% or less, Si: 0.35% or less, S: 0.015% or less, P: 0.03% or less, Cu: 0.30% or less, B: 0.006% or less, and Co: 1.0% or less, and Fe and inevitable impurities constituting a remaining part (balance), and the nickel base alloy material is subjected to solution heat treatment at 1010° C. to 1090° C., and subjected to age-hardening heat treatment at 694° C. to 714° C. for 5 to 7 hours after the solution heat treatment, to thereby provide a jet pump beam made of an improved heat-treated nickel base alloy material.

The jet pump beam and the method for producing the jet pump beam according to the present invention can provide a jet pump beam having a high elastic modulus, high-temperature strength, and high ductility by improving the solution heat treatment and the age-hardening heat treatment on the precipitation-hardened nickel base alloy material to improve anti-stress corrosion cracking properties in high-temperature and high-pressure water.

BRIEF DESCRIPTION OF THE DRAWINGS

FIG. 6 is a table showing a component composition of an improved heat-treated inconel 718 alloy material of each Example constituting the jet pump beam according to the present invention.

FIG. 7 show a test apparatus for evaluating stress corrosion cracking sensitivity of a test piece made of a jet pump beam material: FIG. 7A is a schematic front view of the evaluating test apparatus; and FIG. 7B is a side view thereof.

FIG. 8 is a table showing a stress corrosion cracking test result of a test piece of each Example evaluated by the evaluating test apparatus shown in FIG. 7.

BEST MODE FOR CARRYING OUT THE INVENTION

Figure 1:
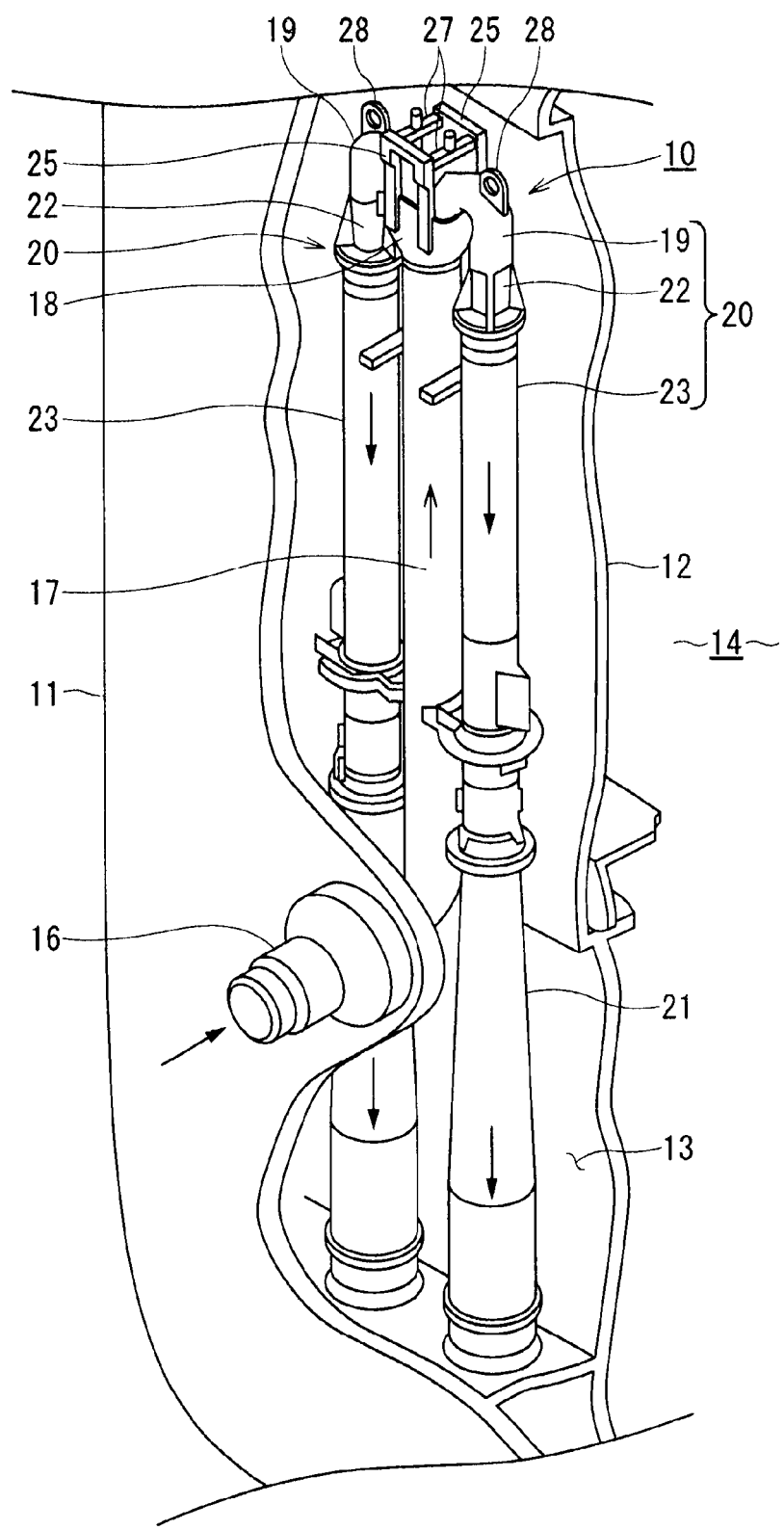
FIG. 1 is a perspective view illustrating a mounting state of a jet pump comprising a jet pump beam according to the present invention.

Preferred embodiments of the present invention will be described by reference to the accompanying drawings. It should be noted that directional references such as upper, lower, right and left in the following description are merely used in a state shown in the drawings.

First Embodiment

FIG. 1 is a perspective view illustrating an installation example of a jet pump comprising a jet pump beam according to the present invention. A jet pump 10 is mounted in an annular downcomer portion 13 between a reactor pressure vessel (RPV) 11 and a core shroud 12 of a boiling water reactor (BWR). The core shroud 12 is formed in a cylindrical shape so as to surround a reactor core 14. A plurality of unillustrated fuel assemblies are loaded in the reactor core 14.

A plurality of sets of jet pumps 10, e.g., 10 sets of jet pumps 10 (20 jet pumps) are provided in the downcomer portion 13 in the reactor pressure vessel 11 at predetermined intervals in a circumferential direction. Each of the jet pumps 10 is connected to an external reactor recirculation system (not shown) inside the reactor pressure vessel 11. The jet pump 10 forcibly feeds a coolant into the reactor core 14 so as to reduce a coolant flow rate to be drawn into the external reactor recirculation system.

The jet pump 10 mainly comprises a riser pipe 17 as a coolant supply pipe extending from a recirculation inlet nozzle 16, a transition piece 18, inlet mixers 20 having paired elbows 19, and diffusers 21. The transition piece 18 is provided integrally on a top portion of the riser pipe 17, to divide a coolant flow rising through the riser pipe 17 into two streams and guide the streams to the elbows 19 of the inlet mixers 20.

In each of the inlet mixers 20, each of the pair of elbows 19 and 19, a jet pump nozzle 22, and an inlet throat 23 are integrally provided. The elbow 19 turns around the coolant from the riser pipe 17. The jet pump nozzle 22 is a mixing nozzle for ejecting the coolant turned around in the elbow 19. The inlet throat 23 captures and mixes surrounding reactor water with the coolant ejected from the jet pump nozzle 22 on an inlet side of the downcomer portion 13. The coolant guided into the inlet throat 23 is mixed with the reactor water inflowing from a peripheral area and guided into the diffuser 21. The mixed water falls through the diffuser 21 to be guided into a core lower plenum in the reactor pressure vessel 11. The mixed water guided to the core lower plenum is turned around therein to be guided into the reactor core 14.

Figure 2:
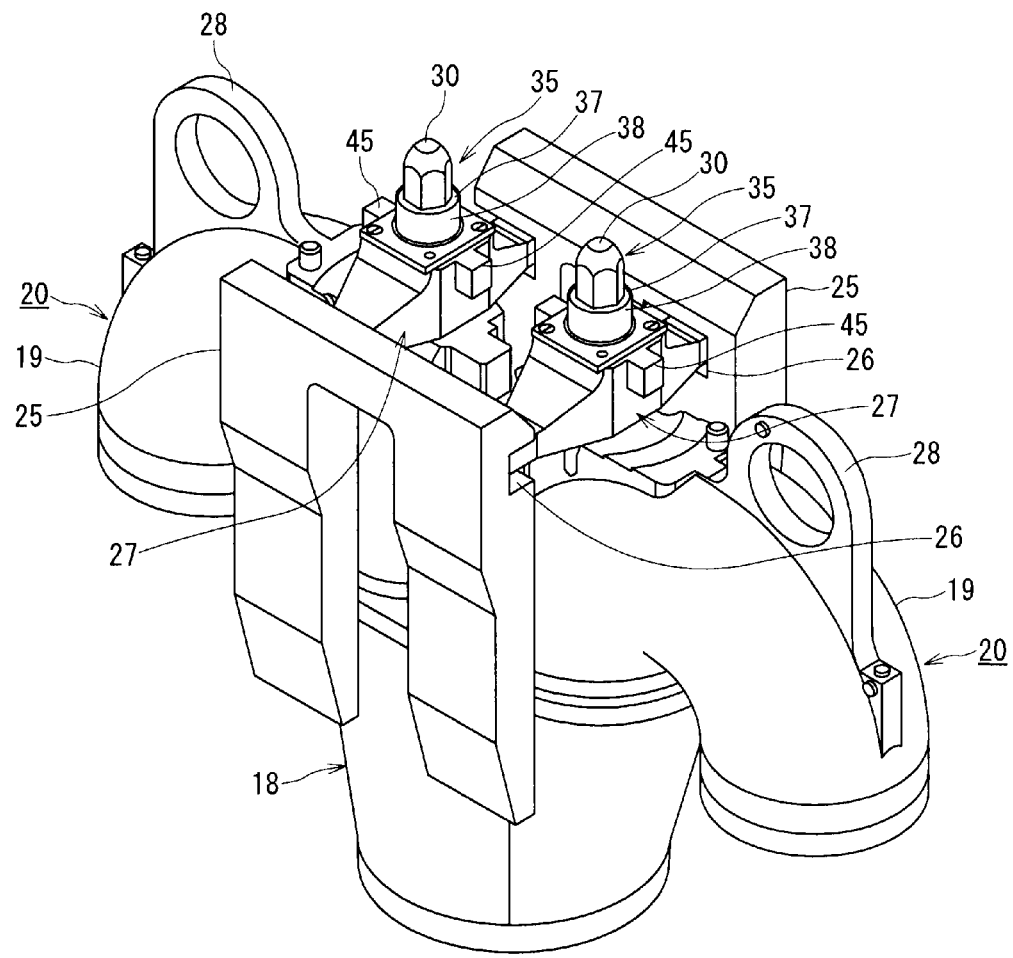
FIG. 2 is a perspective view illustrating a mounting (installation) state of the jet pump beam that press-supports a head portion of the jet pump shown in FIG. 1 (an elbow of an inlet mixer).

As shown in FIG. 2, a pair of gate-type support posts 25 and 25 are vertically arranged facing each other on both sides of a bifurcated portion of the transition piece 18. Horizontally-long groove portions (notches) 26 and 26 are respectively provided in a substantially horizontal direction at positions facing each other in upper end portions of the support posts 25 and 25. The groove portions 26 and 26 constitute pockets. Both ends of a jet pump beam 27 are engaged with the groove portions 26 and 26 so as to press-support each of the elbows 19 of the inlet mixers 20 from above. The both end portions of the jet pump beam 27 have a rectangular shape in cross section, and are engaged to support the elbow 19 in surface contact with upper end surfaces of the groove portions 26 and 26 of the support posts 25.

The jet pump beam 27 is made of a high elastic material having a high elastic modulus as a spring member (an elastic body). The jet pump beam 27 has a sectional area increasing toward a center portion of a beam longitudinal direction. In FIGS. 1 and 2, reference numeral 28 denotes a hanging bolt of the inlet mixer 20.

Figure 3:
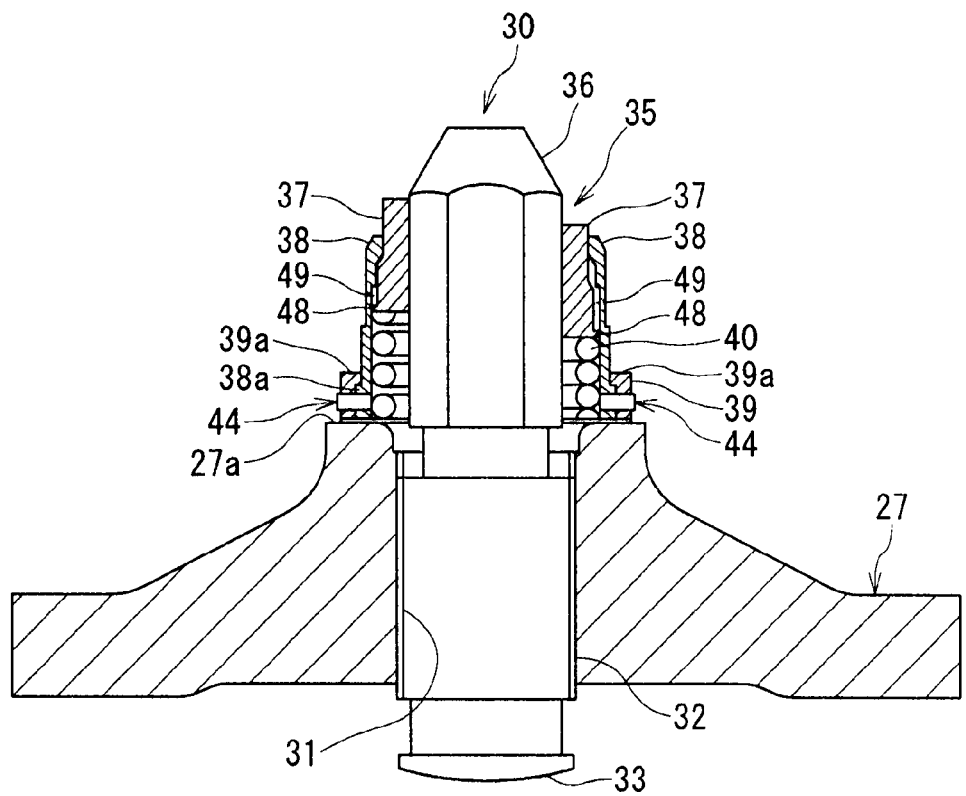
FIG. 3 is a vertical sectional view of the jet pump beam provided to the jet pump shown in FIG. 2.

A head bolt 30 as a pressing constituent member for pressing the elbow 19 down from above is provided in the center portion of the jet pump beam 27. A vertical threaded hole 31 is vertically formed through the center portion of the jet pump beam 27 perpendicular to the beam longitudinal direction as shown in FIG. 3. The head bolt 30 is screwed into the vertical threaded hole 31 so as to penetrate through the vertical threaded hole 31. The head bolt 30 is a polygonal bolt such as a hexagon bolt. A male thread 32 of the head bolt 30 is screwed into the vertical threaded hole 31 of the jet pump beam 27. A distal end thereof (a lower end) is in press-contact with a top portion of the elbow 19 of the inlet mixer 20.

A seat portion is provided on the tope portion of the elbow of the inlet mixer 20. An arc or semi-round-headed boss portion 33 formed at the lower end of the head bolt 30 is in press-contact with a spherical seat (not shown) provided in the seat portion.

The elbow 19 of the inlet mixer 20 is detachably installed on the transition piece 18 by a bolt fixing device 35 of the jet pump beam 27. The bolt fixing device 35 of the jet pump beam 27 has a configuration as shown in FIGS. 3 and 4.

The bolt fixing device 35 comprises the head bolt 30 screwed into the vertical threaded hole 31 of the jet pump beam 27, a lock cap 37, a body housing 38, a base plate 39, and a spring member 40 as shown in FIG. 3. The lock cap 37 is fitted to a polygonal head portion 36 of the head bolt 30 in an integrally-rotatable and axially-slidable manner. The body housing 38 can accommodate the lock cap 37 selectively at a fixed position and a freely-rotatable position. The base plate 39 installs the body housing 38 by fixing the body housing 38 to a top portion base surface 27a of the jet pump beam 27 via a washer or the like. The spring member 40 is accommodated in the body housing 38 so as to urge the lock cap 37 upward with a spring urging force.

Figure 4:
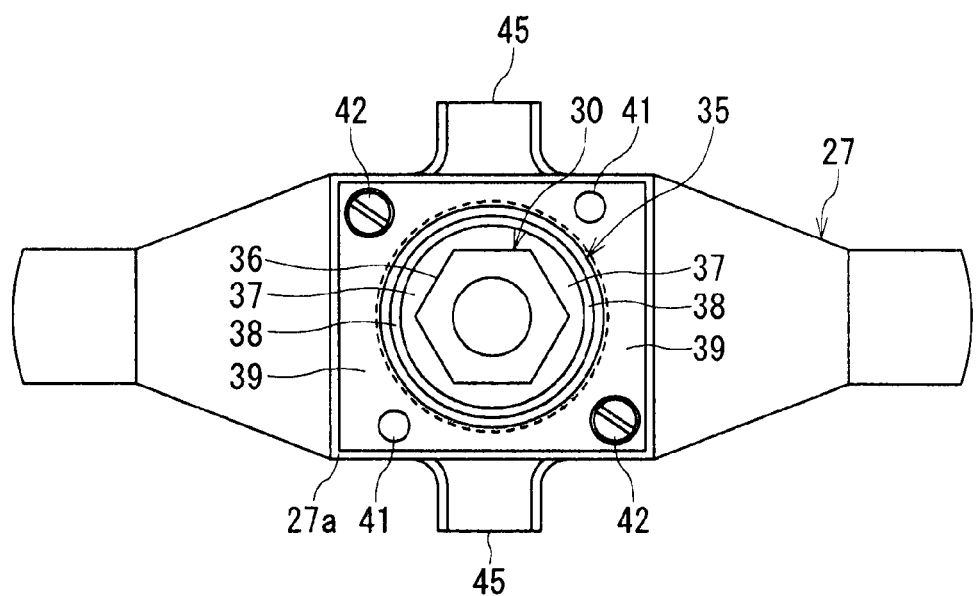
FIG. 4 is a plan view of the jet pump beam shown in FIG. 3.

The base plate 39 is fixed to the top portion base surface 27a of the jet pump beam 27 with positioning pins 41 and small screws 42 (see FIG. 4). An inner peripheral flange 39a of the base plate 39 is provided so as to cover an outer peripheral flange 38a in a lower portion of the body housing 38 while pressing the outer peripheral flange 38a from above. In FIGS. 2 and 4, reference numeral 45 denotes a trunnion formed integrally with the jet pump beam 27.

The base plate 39 comprises a rotation restraint mechanism 44 for restraining rotation of the body housing 38 around an axis. The rotation restraint mechanism 44 detachably engages the body housing 38 with the base plate 39 to thereby restrain the rotation of the body housing 38.

Tapered external teeth 48 are circumferentially formed on an outer peripheral portion of the lock cap 37 of the bolt fixing device 35 so as to expand downward. An internal tooth-shaped groove 49 of the body housing 38 selectively meshes with the external teeth 48. The external teeth 48 of the lock cap 37 mesh with (splined to) the internal tooth-shaped groove 49 of the body housing 38 to be fixed thereto in an integrally-rotatable manner when the lock cap 37 moves upward to assume a left-side position in FIG. 3. When the lock cap 37 assumes a right-side position in FIG. 3, the external teeth 38 are freely rotatable. A lower portion of an inner peripheral wall of the freely-rotatable body housing 38 is formed flush with a bottom portion of the internal tooth-shaped groove 49 on the same inner peripheral surface.

The lock cap 37 and the body housing 38 are made of a hard material such as nickel base alloy. At least the external teeth 48 of the lock cap 37 and the internal tooth-shaped groove 49 of the body housing 38 are made of a hard material. A hard weld overlay material or a weld overlay material containing cobalt is used.

In the bolt fixing device 35, the lock cap 37 is compressed against a spring urging force of the spring member (the elastic body) 40, so that the external teeth 48 of the lock cap 37 and the internal tooth-shaped groove 49 of the body housing 38 are disengaged from each other, and the lock cap 37 assumes a freely-rotatable position as shown on the right half side of FIG. 3. Accordingly, the head bolt 30 can be freely rotated, and the head bolt 30 becomes freely rotatable with respect to the jet pump beam 27. The head bolt 30 can be thereby rotated to move up and down.

In the bolt fixing device 35 of the jet pump beam 27, the inlet mixer 20 is installed on a seat surface of the transition piece 18 on the riser pipe 17 of the jet pump by being press-supported by the bolt fixing device 35 by use of the jet pump beam 27. The jet pump 10 divides the cooling water rising through the riser pipe 17 into two streams in the transition piece 18 and guides the streams to the pair of elbows 19.

The cooling water is turned around in the elbows 19 of the inlet mixers 20, and ejected downward toward suction ports of the inlet throats 23 from the jet pump nozzles 22 on the both outer sides as shown in FIG. 1. When ejected from the jet pump nozzles 22 as a high-speed ejection fluid (driving fluid), the cooling water captures, in the downcomer portion 13, saturated water (coolant) separated through a steam-water separator and a steam dryer (both are not shown) in a reactor core upper portion, and is sucked from a low-pressure area generated at outlets of the jet pump nozzles 22 into the inlet throats 23. After the driving fluid and suction fluid (driven gas) are sufficiently mixed in the inlet throats 23, the mixed fluid restores its pressure in the diffusers 21 and is then sent to the reactor core lower plenum.

The coolant ejected from the jet pump 10 is turned around in the core lower plenum and guided to the reactor core 14. The coolant is heated while passing through the core 14 to result in an air-water mixed two-phase flow, which rises upward, is sent to the unillustrated steam-water separator to be separated, sent to the steam dryer (not shown) to be dried, and sent to a steam turbine from a main steam outlet.

The saturated water guided to the downcomer portion 13 partly moves downward through the downcomer portion 13 and is drawn from an outlet nozzle into two series of recirculation loops. A pressure thereof is increased by a recirculation pump (not shown). After the pressure is increased by the recirculation pump, the saturated water is sent to the riser pipe 17 from the recirculation inlet nozzle 16 of the jet pump 10, rises through the riser pipe 17, is turned around in the elbows 19 of the inlet mixers 20, and ejected again from the jet pump nozzles 22.

Figure 5:
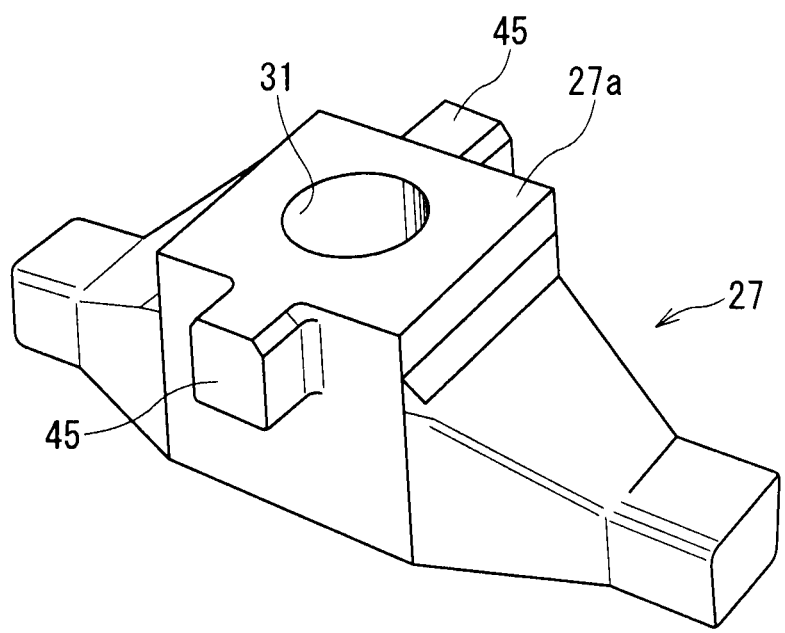
FIG. 5 is a perspective view illustrating the jet pump beam made of an improved heat-treated inconel material according to the present invention.

In this connection, a reactor member that is a spring member made of an improved heat-treated precipitation-hardened nickel base alloy (improved heat-treated inconel 718 alloy) material shown in FIG. 5 is used as the jet pump beam 27 of the jet pump 10. The jet pump beam 27 is made of the improved heat-treated precipitation-hardened nickel base alloy (improved heat-treated inconel 718 alloy) material obtained by improving heat treatment such as solution heat treatment and age-hardening heat treatment on conventional normal heat-treated precipitation-hardened inconel 718 alloy.

[A] Chemical Composition of the Jet Pump Beam Material

The jet pump beam 27 is made of the improved heat-treated precipitation-hardened nickel base alloy (improved heat-treated inconel 718 alloy) material. A material used for the improved heat-treated precipitation-hardened nickel base alloy is similar to a material defined and prescribed in JIS G4901, AMS 5662, and ASTM B670.

The improved heat-treated nickel base alloy used for the jet pump beam 27 is equivalent to inconel 718 alloy, and its chemical component elements are represented by mass % as follows.

The jet pump beam 27 is produced from the improved heat-treated precipitation-hardened nickel base alloy obtained by subjecting to improved solution heat treatment and age-hardening heat treatment, a precipitation-hardened nickel base alloy (inconel 718 alloy) material having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Si: 0.35% or less, Mn: 0.35% or less, S: 0.015% or less, P: 0.03% or less, Cu: 0.30% or less, B: 0.006% or less, and Co: 1.0% or less, and Fe and inevitable impurities constituting a remaining part (balance). The jet pump beam 27 produced as described above is used in the jet pump 10 as the reactor member.

The precipitation-hardened nickel base alloy is subjected to heat treatment such as the improved solution heat treatment and age-hardening heat treatment. The heat treatment is performed by melting the precipitation-hardened nickel base alloy material, subjecting the material to solution heat treatment at 1010° C. to 1090° C., and subjecting the material to age-hardening heat treatment at 694° C. to 714° C. for 5 to 7 hours, to thereby obtain the improved heat-treated precipitation-hardened nickel base alloy (improved heat-treated inconel 718 alloy).

The chemical components (composition elements) of the improved heat-treated precipitation-hardened nickel base alloy are equivalent to those of normal heat-treated (ASTM B637) inconel 718 alloy. The heat treatment in which the solution heat treatment and the age-hardening heat treatment are improved is applied thereto, to thereby produce the improved heat-treated precipitation-hardened nickel base alloy.

The improved heat-treated inconel 718 alloy has an excellently smaller stress corrosion cracking sensitivity under a high-temperature water environment than that of the normal heat-treated inconel 718 alloy or inconel X-750 alloy. It has been found as technical findings that since the stress corrosion cracking sensitivity is small, anti-stress corrosion cracking properties can be improved. The stress corrosion cracking is known to occur when three elements of existence of a tensile stress, usage environment conditions, and characteristics of a material itself are satisfied. In order to prevent the stress corrosion cracking, the anti-stress corrosion cracking properties are improved by improving the characteristics of the material itself and reducing the stress corrosion cracking sensitivity.

Since the jet pump beam 27 is used under a high-temperature and high-pressure radiation environment in a light water reactor, an upper limit is set for the composition elements Co and B of the jet pump beam 27 from the viewpoint of radiation. Practically, it is preferable that C content is set to 0.05% or less, and B content is set to 0.001% or less.

The material used for the jet pump beam 27 has a component composition similar to that defined in JIS G4901, AMS 5661 and ASTM B670 or the like. The strength of the material can be further improved by precipitating $\gamma''$-phase $Ni_3Nb$ as a precipitate by the heat treatment.

Next, a reason why the chemical composition of the jet pump beam 27 is limited will be described hereunder.

(1) Ni

Ni is a main element of the improved heat-treated nickel base alloy, and is a constituent element of $\gamma''$-phase and $\gamma'$-phase precipitates. When a Ni content is less than 50% or exceeds 55%, a content rate of Fe is relatively increased, and parent phase stability is reduced. Therefore, a content rate of Ni is set to a range of 50% to 55%.

(2) Cr

Cr is an element necessary for ensuring corrosion resistance against high-temperature and high-pressure water. When a content rate of Cr is less than 17%, sufficient corrosion resistance cannot be provided. On the other hand, when the content rate of Cr exceeds 21%, a precipitation amount of Cr carbide into grain boundary increases in use at high temperature. Therefore, the content rate of Cr is set to 17% to 21%.

When Cr is added to Ni, the material is passivated in an acid or alkaline aqueous solution, thereby to have strong corrosion resistance.

(3) Nb

Nb is an element necessary for improving high-temperature strength by precipitation hardening, and is a constituent element of $\gamma''$ phase ($Ni_3Nb$) that is a main precipitate of the improved heat-treated nickel base alloy. A chemical composition rate of Nb is preferably set to 4.75% to 5.5%. When Nb content is less than 4.75%, it is difficult to ensure a necessary amount of $\gamma''$-phase ($Ni_3Nb$) precipitate for stable strength, so that the material is insufficiently precipitation-hardened. In contrast, when Nb content exceeds 5.5%, a formation amount of non-solid NbC increases, which is not preferable.

Since Ta is expected to produce a similar effect to that of Nb, a total rate of Nb+Ta may be 4.75% to 5.5%.

(4) Mo

Mo is an element which affects solid solution strengthening of the improved heat-treated nickel base alloy. When Mo content is less than 2.8%, a solid solution strengthening effect is small. In contrast, when Mo content exceeds 3.3%, a precipitation amount of M6C carbide is increased in use at high temperature, which is not preferable. Therefore, a composition rate of Mo is preferably 2.8% to 3.3%.

It has also been found that when Mo is added, the stress corrosion cracking sensitivity can be substantially reduced.

When Mo is added in addition to Ni, an alloy having good corrosion resistance against acid can be also obtained.

(5) Ti

As the same manner as in Al, Ti is an element preferably improving high-temperature strength by forming an intermetallic compound with fine Ni, and affects precipitation strength by forming γ' phase ($Ni_3$ (Al, Ti)) that improves the precipitation strength of the material. When Ti content is less than 0.65%, a precipitation amount of γ' phase is small. In contrast, when Ti content exceeds 1.15%, a formation amount of non-solid TiC is increased.

Therefore, a composition rate of Ti is set to 0.65% to 1.15%.

(6) Al

Al affects precipitation strength by forming γ' phase ($Ni_3$ (Al, Ti)) that improves the precipitation strength of the material in a similar manner to Ti. When a composition rate of Al is less than 0.2%, a precipitation amount is small. In contrast, when the composition rate of Al exceeds 0.8%, stable precipitation cannot be expected from the relationship between Ti concentration and Nb concentration.

Therefore, in order to obtain the stable precipitation strength of the material, Al content is set to a range of 0.2% to 0.8%.

(7) Other Elements

Other elements include Fe and elements inflowing when Fe is added. It is preferable to reduce the other elements as much as possible.

The improved heat-treated nickel base alloy may also has the minor component composition containing C: 0.08% or less, Mn: 0.35% or less, Si: 0.35% or less, S: 0.15% or less, P: 0.03% or less, preferably 0.015% or less, Cu: 0.30% or less, B: 0.006% or less, and Co: 1.0% or less as defined in JIS G4901, AMS 5662 and ASTM B670.

C is an element necessary for improving the material strength. When an excessively large amount of C is contained, however, corrosion resistance is deteriorated, and toughness is also reduced. Thus, C content is set to 0.08% or less.

[B] Mechanical Characteristics of the Jet Pump Beam

The mechanical characteristics of the jet pump beam 27 produced from the improved heat-treated nickel base alloy (improved heat-treated precipitation-hardened inconel 718 alloy) are substantially the same as those of the inconel X-750 alloy used for a conventional jet pump beam.

The mechanical characteristics of the inconel X-750 alloy described in ASTM B637 satisfy following conditions at normal temperature:

tensile strength: 1103 to 1276 MPa,
0.2% proof strength: 689 to 896 MPa,
elongation: 20% or more,
contraction: 20% or more,
Brinell hardness: 267 to 363.

The improved heat-treated nickel base alloy having the mechanical characteristics equivalent to those of the inconel X-750 alloy is used.

[C] Heat Treatment Conditions of the Jet Pump Beam

The jet pump beam 27 is produced from the improved heat-treated nickel base alloy (improved heat-treated precipitation-hardened inconel 718 alloy) material. The jet pump beam 27 is used under a high-temperature and high-pressure environment. Therefore, in order to reduce the stress corrosion cracking sensitivity and ensure easiness of plastic deformation of a metallic material or ductility that represents a state in which the material is easily plastic-deformed at the time of production of the improved heat-treated nickel base alloy, the improved heat-treated precipitation-hardened nickel base alloy is used to produce the jet pump beam 27.

Next, a reason why the heat treatment conditions of the improved heat-treated precipitation-hardened nickel base alloy (the improved heat-treated inconel 718 alloy) are limited will be described hereunder.

A solution heat treatment temperature range of the improved heat-treated nickel base alloy is 1010° C. to 1090° C. When the heat treatment is performed at less than 1010° C., a more amount of δ-phase intermetallic compound or the like is precipitated into crystal grain boundary of nickel base alloy, and the ductility cannot be improved. In contrast, when the heat treatment is performed at more than 1090° C., crystal grain is coarsened, and the material strength is reduced, so that the target mechanical characteristics may not be obtained.

As for the mechanical characteristics of the jet pump beam 27, mechanical characteristic conditions of the currently used inconel X-750 alloy described in ASTM B637 are employed since there are no problems in use of the inconel X-750 alloy.

The mechanical characteristics of the inconel X-750 alloy described in ASTM B637 satisfy following conditions at normal temperature:

tensile strength: 1103 to 1276 MPa,
0.2% proof strength: 689 to 896 MPa,
elongation: 20% or more,
contraction: 20% or more,
Brinell hardness: 267 to 363.

In order to obtain the mechanical characteristics in the improved heat-treated precipitation-hardened nickel base alloy, a heat treatment temperature range of 1010° C. to 1090° C. is preferable as the solution heat treatment temperature. As for cooling conditions, the age-hardening heat treatment is preferably performed at temperatures close to 704° C. as a condition to satisfy the mechanical characteristics of the inconel X-750 alloy at normal temperature.

It has newly been found that as heat treatment on a real structure of the jet pump beam 27, a temperature range of 694° C. to 714° C. is appropriately employed in the age-hardening heat treatment as a temperature range of plus/minus 10° C. from 704° C., and as heat treatment on a real structure of the jet pump beam 27, an age-hardening heat treatment time range of 5 to 7 hours that is a range of plus/minus 1 hour from 6 hours as a preferable time length is appropriate as the age-hardening heat treatment time.

[D] Evaluation Test on Stress Corrosion Cracking Sensitivity of a Test Piece

As shown in FIG. 6, four types of test materials having different component compositions as shown in Examples 1 to 4 were prepared to evaluate the stress corrosion cracking sensitivity of the improved heat-treated inconel 718 alloy. In each of Examples 1 to 4, the chemical composition of the test material is represented by mass %.

The test materials of Examples 1 to 4 shown in FIG. 6 were produced from 4 types of improved heat-treated inconel 718 alloys. Precipitation-hardened nickel base alloy (inconel 718 alloy) was subjected to solution heat treatment at 1030° C., and then subjected to age-hardening heat treatment at 704° C. for 6 hours, to thereby respectively produce a plurality of, e.g., five test pieces made of the improved heat-treated inconel 718 alloy.

After completion of the age-hardening heat treatment, a plurality of, e.g., five test pieces having different component compositions were collected from each of the four types of improved heat-treated inconel 718 alloys. An evaluation test of stress corrosion cracking sensitivity in water having a high temperature corresponding to a temperature within a reactor pressure vessel was performed on the four types of test pieces. The evaluation test was performed by using a CBB (Creviced Bend Beam) test apparatus 50, for example.

FIGS. 7A and 7B show a structure of the CBB test apparatus 50 for evaluating the stress corrosion cracking sensitivity of a test piece 51. The CBB test apparatus 50 clamps and holds the test piece 51 between a pair of test jigs 52a and 52b each having a test surface with a curvature radius of 100R, and tightens the test piece 51 by using bolts 54 and 54. The test piece 51 has a rectangular-plate shape having a size of 10 mm×50 mm×2 mmt, for example.

In the CBB test apparatus 50, graphite wool 55 and spacers 56 are interposed between the test piece 51 and the pair of test jigs 52a and 52b to ensure a gap therebetween.

A CBB test on the test piece 51 was performed by immersing the test piece 51 in high-temperature and high-pressure pure water having, for example, a temperature of 288° C. and a pressure of 7.8 MPa for 500 hours by using an autoclave, dividing the test piece 51 into halves, and examining a maximum crack depth in a halved section. The CBB test was repetitively performed on the plurality of, e.g., the five test pieces 51 of each of the four types of improved heat-treated inconel 718 alloy.

FIG. 8 shows the number of cracks and the maximum crack depth after the CBB test on the test pieces 51 made of the improved heat-treated precipitation-hardened nickel base alloy (improved heat-treated inconel 718 alloy) materials in Examples 1 to 4. As for the improved heat-treated inconel 718 alloy, no stress corrosion cracking occurred in all the four types of test pieces 51 in Examples 1 to 4. It was thereby confirmed that the stress corrosion cracking sensitivity of the test piece was very small, and excellent anti-stress corrosion cracking properties were obtained.

Second Embodiment

A second embodiment of the jet pump beam according to the present invention relates to a technique for producing the reactor member made of the improved heat-treated precipitation-hardened nickel base alloy (the improved heat-treated inconel 718 alloy) shown in FIG. 6, particularly, relates to a technique for producing the jet pump beam 27 shown in FIG. 5.

The jet pump beam 27 is produced by melting the precipitation-hardened nickel base alloy (inconel 718 alloy) material having the chemical composition shown in FIG. 6, subjecting the material to the solution heat treatment within the solution heat treatment temperature range described in the first embodiment, forming the material into a product shape of the jet pump beam 27 by machining or cold working after the solution heat treatment, and then performing the predetermined age-hardening heat treatment thereon. The inconel 718 alloy is subjected to the solution heat treatment within the temperature range of 1010° C. to 1090° C. After the solution heat treatment, the inconel 718 alloy is subjected to the machining such as hot forging or cold forging, or to the cold working in which a metallic material is subjected to plastic working at a recrystallization temperature or less, and thereby formed into the product shape of the jet pump beam.

After being formed into the predetermined product shape, the inconel 718 alloy is subjected to the age-hardening heat treatment at 694 to 714° C. for 5 to 7 hours, to thereby produce the jet pump beam. When the age-hardening heat treatment is performed for a predetermined length of time, γ″ phase (Ni₃Nb) is precipitated in the inconel 718 alloy by the precipitation hardening heat treatment, so that the improved heat-treated inconel 718 alloy is obtained as a high-strength material.

In general, the high-strength material has poor workability. Thus, when the jet pump beam 27 having a complicated product shape is produced, the material is formed into the predetermined product shape by the machining or cold working after the solution heat treatment where the material is easily formed into the product shape. After being formed into the predetermined product shape, the precipitation hardening heat treatment is performed to improve the material strength. Accordingly, the reactor member for the jet pump beam 27 as shown in FIG. 5 is produced.

As an actual reactor member, the improved heat-treated precipitation-hardened nickel base alloy material was prepared by improving the heat treatment on the precipitation-hardened nickel base alloy (in a material-molten state) having the component composition shown in FIG. 6, and the jet pump beam 27 was experimentally produced by using this improved heat-treated nickel base alloy.

At the time of actually producing the jet pump beam 27, die forging was performed after melting the precipitation-hardened nickel base alloy (inconel 718 alloy) material, to roughly form the jet pump beam. After this rough formation, the inconel 718 alloy was subjected to the solution heat treatment within the predetermined temperature range, and finished by the machining or cold working. After the jet pump beam was finished, the age-hardening heat treatment was subsequently performed to produce the improved heat-treated inconel 718 alloy. The jet pump beam 27 made of the improved heat-treated inconel 718 alloy was thereby produced as shown in FIG. 5.

As described above, the jet pump beam 27 is produced as shown in FIG. 5 as the spring member used in an actual boiling water reactor. Even when used under a high-temperature and high-pressure environment, the jet pump beam 27 has excellent anti-stress corrosion cracking properties with small stress corrosion cracking sensitivity, and has a high elastic modulus, high-temperature strength, and excellent ductility.

The invention claimed is:

1. A jet pump beam made of improved heat-treated nickel base alloy, produced by preparing a precipitation-strengthened nickel base alloy material having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Mn: 0.35% or less, Si: 0.35% or less, S: 0.015% or less, P: 0.03% or less, Cu: 0.30% or less, B: 0.001% or less, and Co: 0.05% or less, and Fe and inevitable impurities constituting a remaining part,
the nickel base alloy material having been subjected to solution heat treatment at a temperature of 1010° C. to 1090° C., and
the nickel base alloy material having a γ″ phase (Ni₃Nb) precipitate formed by subjecting the nickel base alloy material to age-hardening heat treatment at a temperature of 694° C. to 714° C. for 5 to 7 hours after the solution heat treatment.

2. The jet pump beam according to claim 1, produced from an improved heat-treated nickel base alloy material obtained by forming the nickel base alloy material into a product shape by machining or product processing after the solution heat treatment, and subsequently subjecting the material to the age-hardening heat treatment.

3. A method for producing a jet pump beam made of improved heat-treated nickel base alloy, comprising the steps of: preparing a precipitation-strengthened nickel base alloy material having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Mn: 0.35% or less, Si: 0.35% or less, S: 0.015% or less, P: 0.03% or less, Cu: 0.30% or less, B: 0.001% or less, and Co: 0.05% or less, and Fe and inevitable impurities constituting a remaining part;
forming the nickel base alloy material into a product shape by machining or cold working after subjecting the nickel base alloy material to solution heat treatment at a temperature of 1010° C. to 1090° C.; and subjecting the nickel base alloy material formed into the product shape to age-hardening heat treatment at a temperature of 694° C. to 714° C. for 5 to 7 hours, thereby to precipitate a γ" phase ($Ni_3Nb$) in the nickel base alloy material.

4. The method for producing a jet pump beam according to claim 3, wherein the jet pump beam made of improved heat-treated nickel base alloy is produced by roughly forming the nickel base alloy material into the product shape by die forging after melting the nickel base alloy material, subjecting the roughly formed nickel base alloy material to the solution heat treatment at a temperature of 1010° C. to 1090° C., finishing the nickel base alloy material by the machining or the cold working, and subjecting the finished nickel base alloy material to the age-hardening heat treatment at a temperature of 694° C. to 714° C. for 5 to 7 hours, thereby to precipitate a γ" phase ($Ni_3Nb$) in the nickel base alloy material.

5. A jet pump beam used in a jet pump for forcibly circulating high-temperature and high-pressure water within a reactor pressure vessel of a boiling water reactor, the jet pump beam comprising:

a body made of an elastic material;

a vertical threaded hole provided in a center portion of the body, into which a head bolt is screwed; and a body top portion support surface for supporting a head bolt fixing device, wherein the body is made of precipitation-strengthened nickel base alloy having a component composition containing by mass %, Ni: 50.0% to 55.0%, Cr: 17.0% to 21.0%, Nb+Ta: 4.75% to 5.50%, Mo: 2.8% to 3.3%, Ti: 0.65% to 1.15%, Al: 0.2% to 0.8%, C: 0.08% or less, Mn: 0.35% or less, Si: 0.35% or less, S: 0.015% or less, P: 0.03% or less, Cu: 0.30% or less, B: 0.001% or less, and Co: 0.05% or less, and Fe and inevitable impurities constituting a remaining part, and the nickel base alloy material is subjected to solution heat treatment at a temperature of 1010° C. to 1090° C., and subjected to age-hardening heat treatment at a temperature of 694° C. to 714° C. for 5 to 7 hours after the solution heat treatment, to thereby precipitate γ" phase ($Ni_3Nb$) in the nickel base alloy material and provide a jet pump beam made of an improved heat-treated nickel base alloy material.

* * * * *